No. 802,120. PATENTED OCT. 17, 1905.
F. P. SHERIDAN.
SANITARY WATER CLOSET.
APPLICATION FILED MAY 18, 1905.
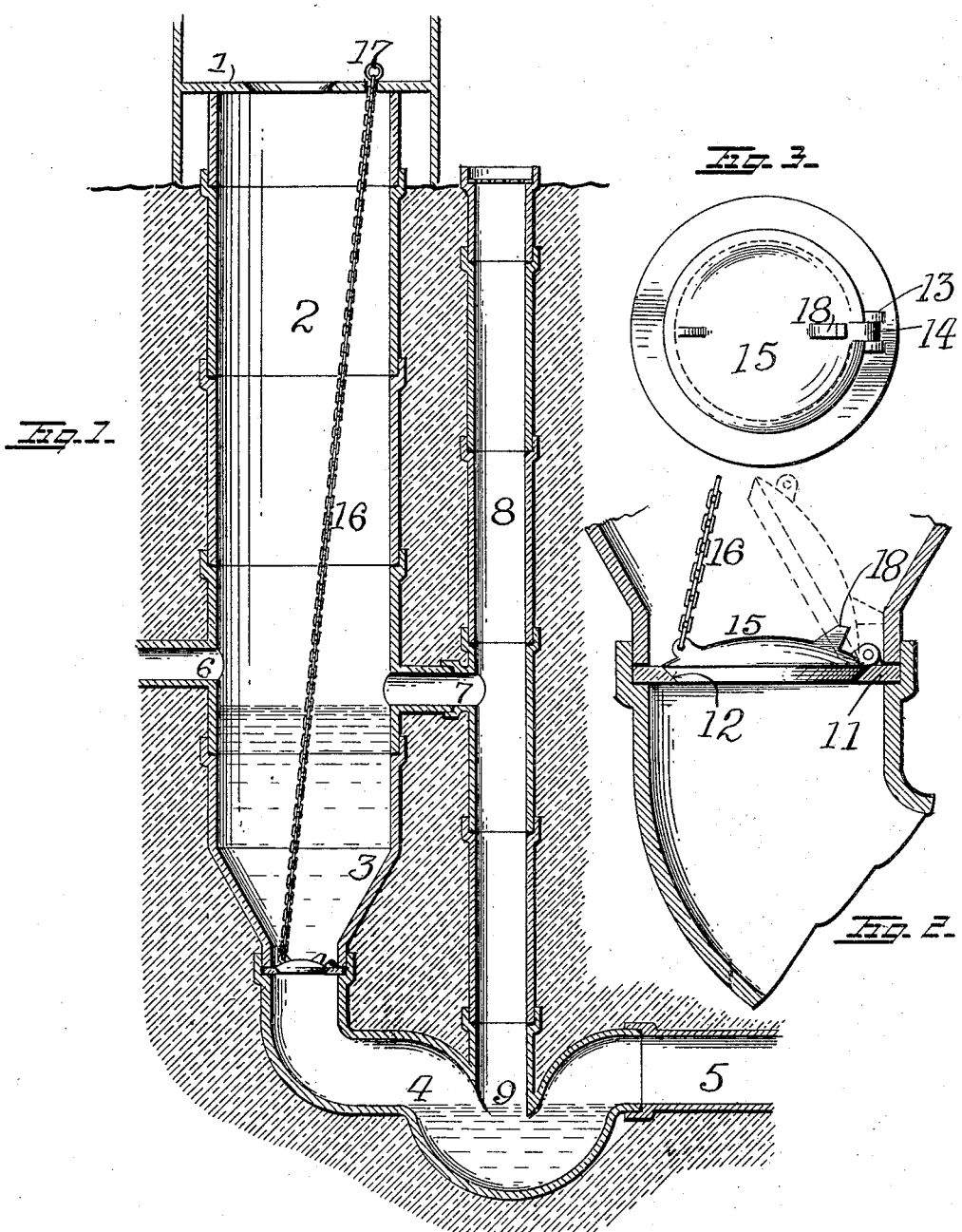

UNITED STATES PATENT OFFICE.

FRANK P. SHERIDAN, OF TOLEDO, OHIO.

SANITARY WATER-CLOSET.

No. 802,120. Specification of Letters Patent. Patented Oct. 17, 1905.

Application filed May 18, 1905. Serial No. 260,990.

*To all whom it may concern:*

Be it known that I, FRANK P. SHERIDAN, of Toledo, county of Lucas, and State of Ohio, have invented certain new and useful Improvements in Sanitary Water-Closets; and I do hereby declare that the following is a full, clear, and exact description of the invention, which will enable others skilled in the art to which it appertains to make and use the same, reference being had to the accompanying drawings, and to the figures of reference marked thereon, which form part of this specification.

This invention relates to baths and closets, and more particularly to water-closets which have a wash-out; and the object of the same is to improve the construction of the outlet-valve and the ventilator.

To this end the invention consists in the details set forth below, and shown in the accompanying drawings, wherein—

Figure 1 is a section of this entire device. Fig. 2 is an enlarged section of the outlet-valve and its seat. Fig. 3 is a plan view of the valve.

In the drawings the numeral 1 designates the water-closet seat, and 2 is a quite large pipe depending therefrom and preferably reduced in diameter beneath the ground, as at 3. At its lower end it connects with a trap 4, which preferably stands horizontally, as shown, and in turn leads into the sewer connection 5.

6 is the pure-water inlet, as from the water system, cistern-overflow, or other source, and 7 is the outlet or overflow, preferably arranged at the other side of the pipe 2 and at a little lower level than the inlet 6.

8 is the ventilator, which is preferably an upright pipe having a grating at its upper end, and it communicates at its lower end 9 with the throat of the trap. The outlet 7 is directed into this ventilator-pipe, so that the constantly-running water from the main pipe 2 passes down the ventilator into the throat of the trap. I consider the latter arrangement advantageous, because if this water entered at a point in advance of the throat it would have no different effect from the charge of water in the main pipe when let out, and if it entered the trap in rear of the throat it would not produce that constant agitation of the material standing in the trap, which is so desirable in sanitary plumbing; but by leading this constantly-running water directly into the throat of the trap I gain all the advantages which sanitation demands. Moreover, by removing the grating at the top of the ventilator I can at any time insert a tool for the purpose of cleaning out the trap if it should become clogged.

The outlet-valve in the main pipe possesses certain peculiarities. Clamped between the sections of the pipe 2 or its reducer 3 is an annular ring 11, containing a valve-seat 12, and pivoted between ears 13 on this ring is the ear 14 of the valve 15, whose periphery is shaped to fit the seat, as shown. This valve may be raised by any suitable means; but I have shown a chain 16, leading upward to a handle 17 above the water-closet seat 1. I consider it desirable to provide this valve near its hinge with a stud 18 of such length that when the valve is raised, as seen in dotted lines in Fig. 2, the stud will strike within the pipe and prevent the lifting of the valve to a point from which it would not readily fall again into its closed position.

The use of this improved closet will be readily understood. Running water entering at 6 stands constantly at the level indicated in Fig. 1, overflows at 7, trickles down the ventilator 8 and issues at 9 into the throat of the trap, thereby constantly washing the latter. When the closet is used, the valve 15 is raised by drawing on the chain, and the charge of water within the main pipe flushes the trap, as will be clear. When the valve is again closed, the running water entering at 6 reëstablishes the water-level within the main pipe, and thus seals the latter against the emission of odors. The lower end 9 of the ventilator is of course sealed against the emission of odors, and the outlet 7 permits the exit through the ventilator of such odors as may accumulate in the main pipe above the water-level.

I do not confine myself to the shape and proportion of parts, and in many cases it may be desirable to elevate the outlet end of the ventilator.

What is claimed as new is—

In a water-closet, the combination with the seat, an upright main pipe, a trap, and a sewer connection; of an annular ring clamped between the sections of the main pipe and having a valve-seat and ears, a valve adapted to fit said seat and having an ear pivoted to those on the ring, a stud on this valve adjacent its hinge and of a length to engage within the pipe and prevent the valve from rising to a vertical position, and means for raising the valve at will, as and for the purpose set forth.

In testimony that I claim the foregoing as my own I affix my signature in presence of two witnesses.

FRANK P. SHERIDAN.

Witnesses:
CARL H. KELLER,
F. M. BRESER.